May 12, 1970 P. T. HARSHA 3,511,099
REPLACEABLE TIP GAS SAMPLING PROBE
Filed Sept. 5, 1968 2 Sheets-Sheet 1
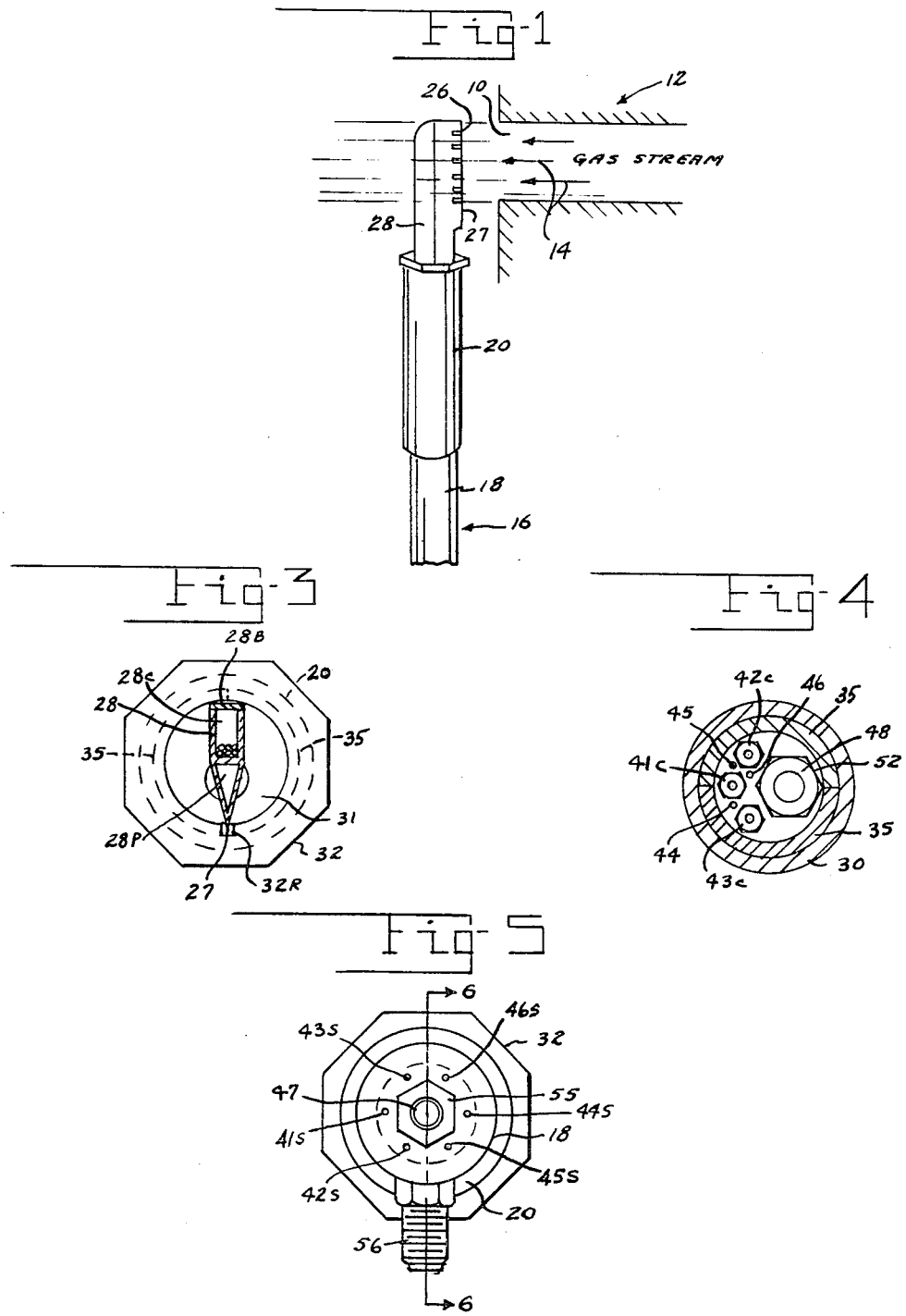
INVENTOR.
PHILIP T. HARSHA
BY Harry A. Herbert Jr
and
Albert H. Reuther
ATTORNEYS

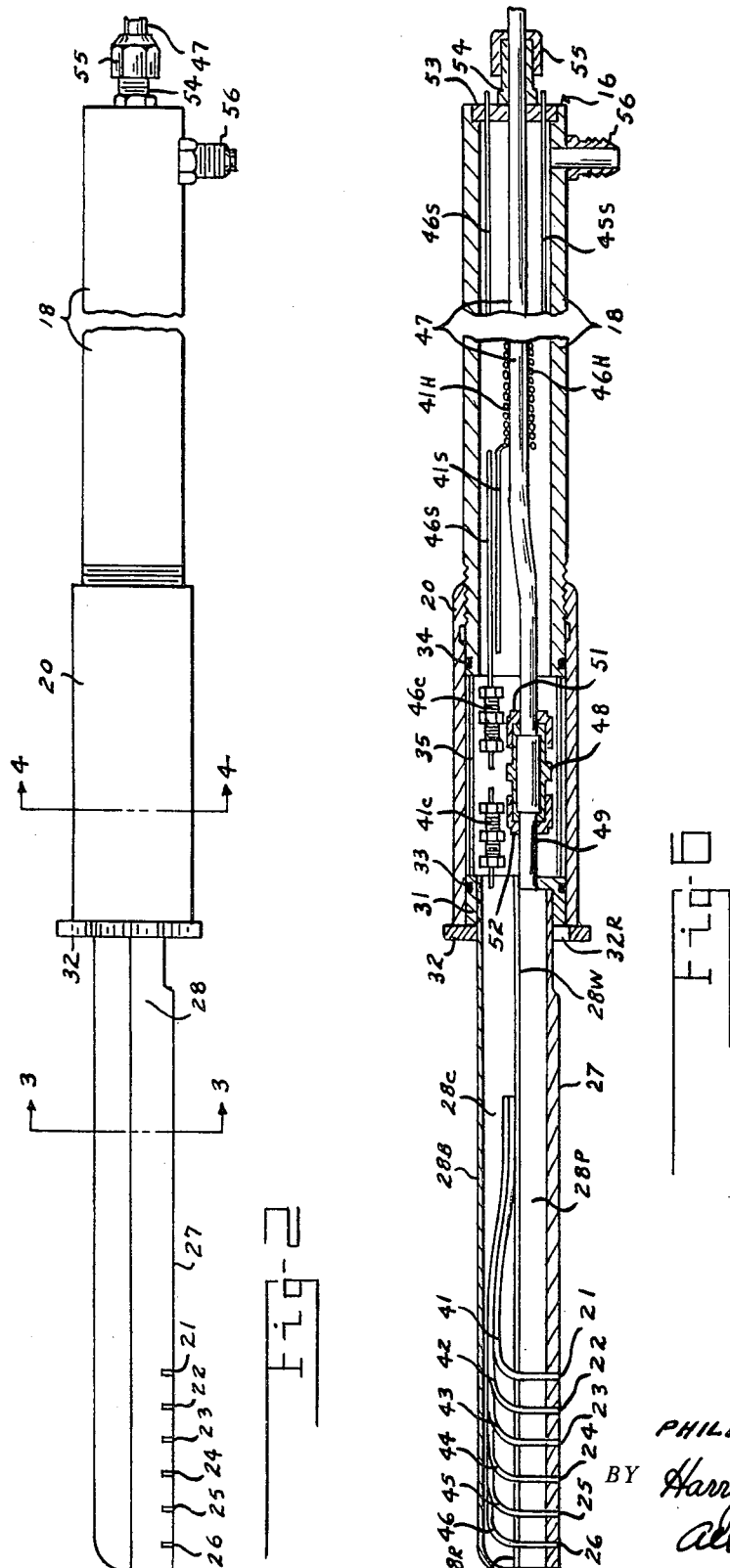

United States Patent Office 3,511,099
Patented May 12, 1970

3,511,099
REPLACEABLE TIP GAS SAMPLING PROBE
Philip T. Harsha, Tullahoma, Tenn., assignor to the United States of America as represented by the Secretary of the Air Force
Filed Sept. 5, 1968, Ser. No. 757,630
Int. Cl. G01n 1/26
U.S. Cl. 73—421.5                     3 Claims

ABSTRACT OF THE DISCLOSURE

A gas sampling probe has coolant tubes and gas conduits that extend through hollow interior into a rake type of aerodynamic tip readily separable from a main support. A sleeve and split spacers complement the tip and main support at a location for access to couplings of the tubes and conduits. The sleeve and spacers are removed to get to the couplings that make it possible to change the tip which deteriorates in the gas stream probed for evaluating sonic and supersonic combustion engine performance.

BACKGROUND OF THE INVENTION

Field of the invention

This invention relates to probes for sampling high temperature and high velocity gas streams such as produced in jet engines.

Description of the prior art

A probe having internal coolant tubes and gas conduits is movable in test position for intercepting a gas stream from an engine outlet opening. The aerodynamic tip of the probe has a sharp leading edge to avoid normal shock wave of the gas stream. The sharp leading edge is incompatible with adequate cooling requirements and quickly deteriorates due to insufficient cooling or corrosive action of the gas stream, necessitating the replacement of the probe. In previous probes, the aerodynamic tip is integral with the main structural body of the probe. Replacement involves the removal of the entire probe assembly. Refurbishment of the probe ordinarily is uneconomical, particularly if heat deterioration of the leading edge of the aerodynamic tip results in large cooling water leaks or failures in brazed joints. The entire probe assembly must be discarded even though often a large part of the assembly has sustained no damage.

U.S. Pats. 2,970,475—Werner issued Feb. 7, 1961 and 3,167,956—Grey issued Feb. 2, 1965 are representative of prior art gas sampling probes having integral aerodynamic tips.

SUMMARY OF THE INVENTION

The aerodynamic tip is separable from structural probe support and replaceable while the probe support remains mounted in test position. A hollow interior formed by the tip and support contains coolant tubes and gas conduits joined by couplings at an intermediate location. The tip and support are interconnected by a sleeve that surrounds split spacers. There is access to the couplings when the sleeve and spacers are removed from location between the tip and support. Capability to change the aerodynamic tips results in a significant savings in setup and teardown time. One probe support accepts different tips for various specific measurements. Interchangeable tips provide manufacturing and material economy. Cost is minimized for servicing the readily interchangeable aerodynamic tips having inlet openings to gather gas samples by stream immersed probe. The part of the probe remaining free of damage or need for interchange is kept installed to facilitate measurements by gas sampling probe movable in the gas stream being studied.

BRIEF DESCRIPTION OF THE DRAWING

FIG. 1 is a fragmentary perspective view of a gas stream outlet and replaceable aerodynamic tip on the gas sampling probe support.

FIG. 2 is a side view of the assembled replaceable tip and probe support.

FIG. 3 is a cross-sectional view taken along line 3—3 in FIG. 2.

FIG. 4 is a cross sectional view taken along line 4—4 in FIG. 2.

FIG. 5 is an end view of the assembly of FIG. 2.

FIG. 6 is a cross sectional view taken along line 6—6 in FIG. 5.

DESCRIPTION OF THE PREFERRED EMBODIMENT

Referring to FIG. 1, the outlet 10 of the combustor of a test model ramjet engine 12 is shown diagrammatically. Combustion of fuel and air mixture provides exhaust in a high temperature and high velocity gas stream 14. The exhaust gases are sampled at numerous points by a hollow probe 16 having main support 18. A sleeve 20 is threaded to the support 18 as shown by FIGS. 1, 2 and 6. There are plural inlets 21, 22, 23, 24, 25, 26 along the leading edge 27 of a water cooled, wedge shaped aerodynamic tip 28 secured to support 18 by sleeve 20. The probe 16 is suitably mounted to traverse the outlet 10 in a conventional manner. Air source and test chamber facilities including suitable engine and probe mountings are not shown in the drawings.

A sleeve retainer 31 abuts a radial member 32 and has a recess for an O-ring seal 33 that peripherally engages the end of the sleeve 20 opposite from its threaded-engagement with the support 18. Another recess and O-ring seal 34 are provided with the main support 18 adjacent the threaded end thereof as shown in FIG. 6. The sleeve retainer 31 is brazed to the aerodynamic tip 28 and the radial member 32 is brazed to the sleeve 20 at its unthreaded end. Axially between the main support 18 and sleeve retainer 31 there are split spacers 35 that fit concentrically inside the sleeve 20. The spacers 35 are made as a cylinder cut in half longitudinally of the axis of probe 16. The two halves are complementary to each other. The section of FIG. 6 is taken along the line of split of spacers 35.

Change of the rake type of aerodynamic tip from the main support occurs by unthreading the sleeve. Access to the hollow interior of the probe is provided due to removal of the sleeve and split spacers. Internal union couplings and connections are then serviceable as subsequently described.

The aerodynamic tip 28 is made of a copper wedge section machined from a solid block including a channel 28C along the back or the trailing edge away from the leading edge 27. A triangular passage 28P is drilled and broached into the wedge section in a location adjacent to the leading edge 27. A coolant, such as water, circulated through passage 28P then is able to be as close as possible to the leading edge 27 of the aerodynamic tip 28. The coolant moves from the passage 28P through a return opening 28R to the channel 28C. A back 28B suitably brazed to the wedge section in a water tight and sealed condition closes off the channel 28C. A web 28W separates the channel 28C from the passage 28P except at return opening 28R.

Plural tubular conduits 41, 42, 43, 44, 45 and 46 pass through the channel 28C and through suitable passages of the web 28W into terminating positions with the openings of inlets 21 through 26, respectively. The terminating ends of the conduits are brazed to the periphery of the inlet openings along the leading edge 27. The conduits are also brazed to the web 28W prior to closure of the rake by brazing of the back 28B to the wedge section. The back is made of a strip of copper. The plural conduits 41 through 46 inclusive have separable connections such as 41C and 46C shown in FIG. 6 as well as 42C and 43C visible in the cross sectional view of FIG. 4. These connections 41C through 46C comprise ferrule-type union fittings that are threaded and separable during replacement of a rake type of aerodynamic tip installed on main probe support 18. Access to the connections is gained by unscrewing the threaded end of said sleeve 20 from its engagement with said support 18 and simultaneously axially sliding the unthreaded end thereof and the radial member 32, brazed thereto and having a recess 32R for the leading edge 27, along the aerodynamic tip followed by removal of the split spacers 35 from location axially between the replaceable tip and main support. Each of the connections 41C through 46C has corresponding tubular conduits 41S through 46S of stainless steel extending into the hollow interior of the main support 18. Each of the stainless steel conduits includes a wound-helix portion 41H through 46H peripherally on a tube 47 through which coolant water is supplied to the probe 20. The wound helix portions around the tube 47 provide sufficient play for attachment of the gas sample conduits at the connections between the replaceable tip and support. An intermediate ferrule-type union fitting assembly 48 is provided and a short length of tube 49 is brazed to the wedge section of the tip to complete the coolant supply line through the probe. The union fitting assembly 48 has caps 51 and 52 threaded into sealing engagement at opposite ends of the coupling for water tubes 47 and 49, respectively.

A cylindrical cover 53 is brazed to an end of the main support 18. A threaded fitting 54 is carried by the cover 53. The tube 47, through which coolant water is supplied, is held by a cap 55 on fitting 54 as shown in FIGS. 2 and 6 of the drawings. An outlet fitting 56 is brazed to the main support 18. Coolant returned from the conduit 28C and through the interior of the main support 18 has a return flow through fitting 56 to the source of coolant water (not shown). The O-ring seals 33 and 34 maintain the water tight integrity of the interfit of sleeve 20 between the replaceable aerodynamic tip and main support. The conduits 41S through 46S are brought out through the cover 53 as shown in views of FIGS. 5 and 6. The ferrule-type fitting connections are readily separable and reassembled. A tip 28 is quickly changed in the event the leading edge 27 is damaged. The main support 18 remains in place requiring little if any maintenance due to exposure to the hot stream from the outlet 10 of the combustion engine.

I claim:
1. A probe for high velocity gas sampling in a high temperature stream from a combustor comprising, a hollow main support having one end with a plurality of openings therein, a first coolant tube held by said main support and extending through one of said openings, a first plurality of gas conduits supported by said main support and extending through others of said openings, an aerodynamic tip having plural inlets, a second plurality of gas conduits positioned inside said tip in communication with respective inlets of said tip corresponding thereto, plural coupling means interconnected between said first and second plurality of conduits, a second coolant tube carried by said tip, a union coupling interconnected between said first and second coolant tubes, a sleeve member interconnected between said support and said aerodynamic tip, first seal means disposed between one end of said sleeve member and said main support, and the other end of said sleeve member and said aerodynamic tip to protect said probe from water leakage, and second seal means disposed on, and sealing opposite ends of said union coupling, said sleeve member being removable from the interconnection thereof between said support and said tip to thereby provide for the inspection and repair of said first and second seal means, said coupling means and union coupling and the replacement of said tip, said first-named plurality of gas conduits each further incorporating a flexible portion for ensuring the relative movement therewithin required to facilitate both the interconnection thereof with, and disassembly from, said plural coupling means.

2. The probe as in claim 1, said sleeve member further having a pair of split spacers interfitted in concentric relation therewithin and disposed inwardly thereof axially in intermediate relation between said support and said tip.

3. The probe as in claim 1, said first-named plurality of gas conduits each having a conduit-portion coiled in a helix around said first-named coolant tube positioned in said support to thereby allow for sufficient play in each of said conduits to permit separation both of a respective conduit from the coupling means corresponding thereto and the tip from said probe support during the replacement thereof.

References Cited
UNITED STATES PATENTS

| | | | |
|---|---|---|---|
| 2,030,682 | 2/1936 | Campbell | 73—422 |
| 2,209,152 | 7/1940 | Daniels | 285—133 XR |
| 2,534,181 | 12/1950 | Roberts | 73—422 |
| 3,085,435 | 4/1963 | Miscoe et al. | |

S. CLEMENT SWISHER, Primary Examiner

H. C. POST III, Assistant Examiner